(12) United States Patent
Austin et al.

(10) Patent No.: US 6,396,726 B1
(45) Date of Patent: May 28, 2002

(54) LOW COST SWITCHABLE POWER SUPPLY

(75) Inventors: Micheal Austin, Lilburn; Robert Cauffield, Lawrenceville, both of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/860,934

(22) Filed: May 18, 2001

(51) Int. Cl.[7] .................................................. H02M 1/10
(52) U.S. Cl. ...................... 363/142; 363/146; 439/174; 439/170
(58) Field of Search ................................ 363/142, 143, 363/144, 146; 439/166, 170, 1, 174

(56) References Cited

U.S. PATENT DOCUMENTS 6,089,886 A * 7/2000 Mareno ...................... 439/131
6,325,646 B1 * 12/2001 Uemura et al. ............. 439/131

* cited by examiner

*Primary Examiner*—Adolf Deneke Berhane
*Assistant Examiner*—Gary L. Laxton
(74) *Attorney, Agent, or Firm*—Philip H. Burrus, IV; Bockhop & Reich, LLP

(57) ABSTRACT

A switchable power supply includes a moveable electrical plug holding member that has a first position, which places an electrical plug pair in position for use with a first voltage standard, and a second position, which places the electrical plug pair in position for use with a second voltage standard. A switch is in a first state when the moveable electrical plug holding member is in the first position and is in a second state when the moveable electrical plug holding member is in the second position. When the switch is in the first state, a voltage modifier circuit generates a first output voltage and when the switch is in the second state, the voltage modifier circuit generates a second output voltage.

6 Claims, 2 Drawing Sheets

110V: AB, DE CONNECTED
230V: BC, EF CONNECTED

LOW COST SWITCHABLE POWER SUPPLY

BACKGROUND OF THE INVENTION

1. Field of the Invention

The present invention relates to power supplies and, more particularly, to a power supply capable of being switched between two different input voltages.

2. Description of the Prior Art

A universal power supply, such as one used to supply a battery charger, may be used irrespective of the voltage standard employed by the country in which the power supply is being used. The United States uses the 110V 60 Hz standard, whereas Europe uses the 230V 50 Hz standard. Often, different countries use different types of electrical plugs. While some universal power supplies may include a switch to allow them to be used with the different standards, most have significant electronic circuitry necessary to cover a wide range of voltages and the circuitry tends to be higher rated and, therefore, more costly. Furthermore, with existing power supplies, it is possible to forget the position of the switch and, therefore, it is possible to apply the wrong voltage to the power supply.

Therefore, there is a need for a universal power supply that automatically configures itself for a voltage corresponding to a given electrical standard.

DETAILED DESCRIPTION OF THE INVENTION

Figure 1:
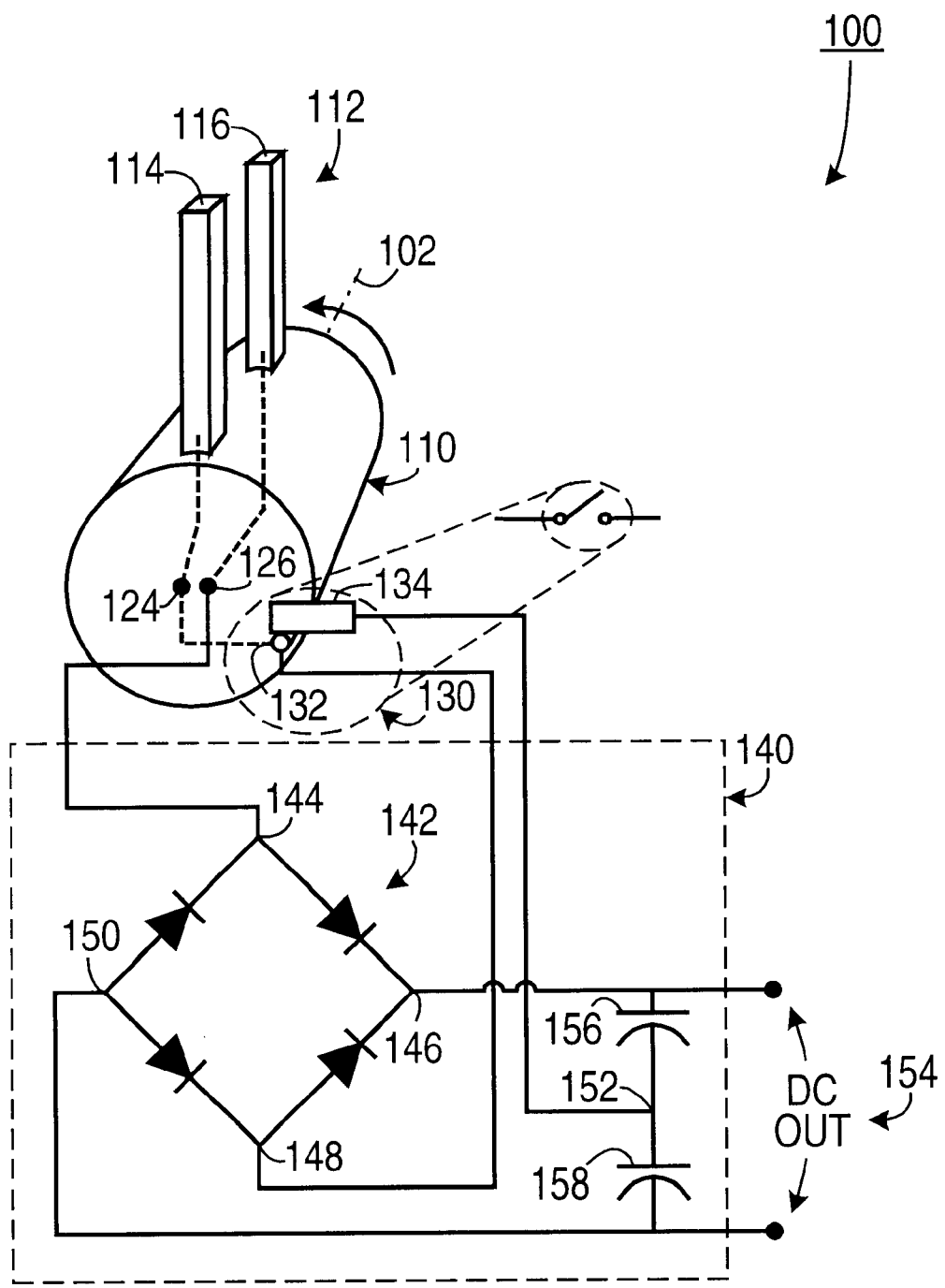
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one illustrative embodiment of the invention is a switchable power supply that has a rotatable drum 110, having an axis of rotation 102. The rotatable drum 110 includes an electrical plug pair that extends radially outward from the rotatable drum 110 along a normal to the axis of rotation 102. The plug pair 112 includes a first conductive tine 114 and a second conductive tine 116. The rotatable drum 110 also includes a first connection 124 in electrical communication with the first conductive tine 114 and a second connection 126 that is in electrical communication with the second conductive tine 116.

Figure 2:
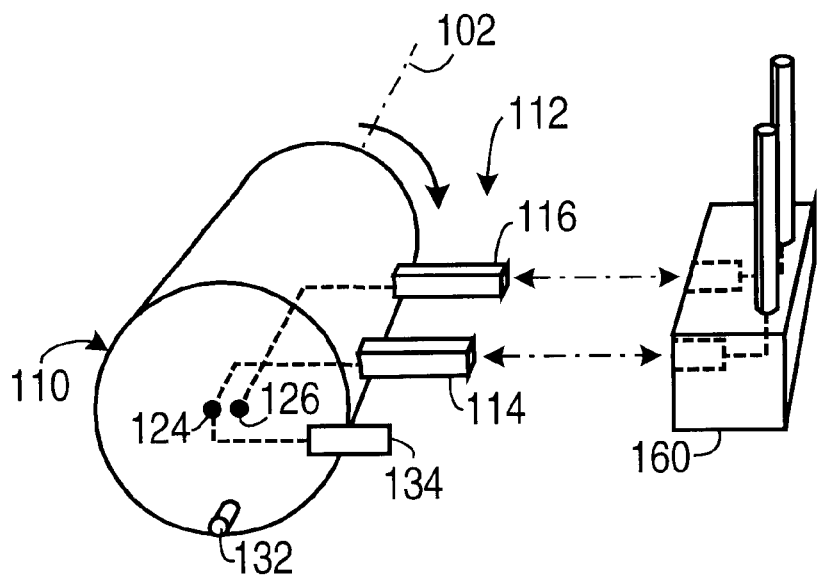
FIG. 2 is a schematic diagram of the embodiment of FIG. 2 in an alternate position.

The rotatable drum 110 has a first position (as shown in FIG. 1), which places the electrical plug pair 112 in a position for use for a first voltage standard, and a second position (as shown in FIG. 2), which places the electrical plug pair 112 in position for use for as second voltage standard. A switch 130 is disposed on the rotatable drum 110 and includes a first contact 132 disposed on the rotatable drum 110 and a second contact 134 that is disposed away from the rotatable drum 110. The switch 132 is positioned so that when the rotatable drum 110 is in the first position, the first contact 132 is electrically coupled to the second contact 134 and, thus, the switch 130 is closed. When the rotatable drum 110 is in the second position, the first contact 132 is not electrically coupled to the second contact 134 and, thus, the switch 130 is open. When in the second position, an adapter 160 that is may be plugged into an outlet of the type used with the second voltage standard may be applied to the plug pair 112.

A voltage modifier circuit 140, which in this embodiment includes a bridge circuit 142, is electrically coupled to the first connection 124 and to the second connection 126. The voltage modifier circuit 140 is capable of generating a first output voltage when switch 130 is closed and a different second output voltage when switch 130 is open.

The voltage modifier circuit 140, in the example shown, includes a diode bridge 142 that acts as a voltage doubler. The diode bridge 142 has a first node 144, a second node 146, a third node 148 and a fourth node 150. The first node 144 is electrically coupled to the first connection 124 and the third node 148 is electrically coupled to the second connection via the first contact 132. The second node 146 and the fourth node 150 are electrically coupled to a direct current output 154. A fifth node 152 is electrically coupled to the second contact 134 and the second node 146 through a first capacitor 156 and is electrically coupled to the fourth node 150 through a second capacitor 158.

Figure 3:
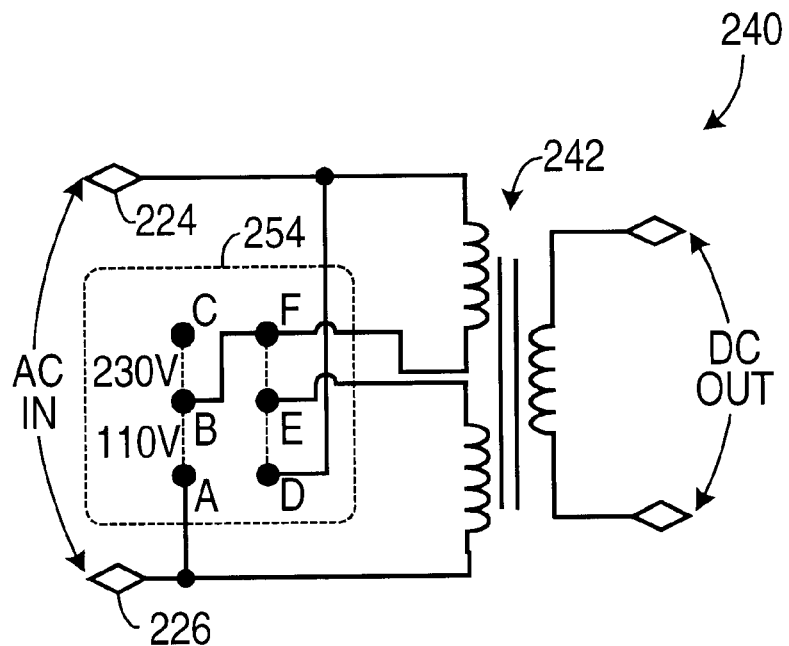
FIG. 3 is a schematic diagram of a second example of a voltage modifier circuit that may be employed with the invention.

Another example of a voltage modifier circuit 240 is shown in FIG. 3, in which the first connection 224 and the second connection 226 are fed into a transformer 242 having a center tap on its primary side. A dual pull-dual throw switch 254 which places the system into either a 110V mode or a 230V mode, depending upon the position of the plug, as described above. To achieve a 110V configuration, the switch 254 connects node A to node B and node D to node E. To achieve a 230V configuration, the switch 254 connects node B to node C and node E to node F.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A switchable power supply, comprising:
    a. a moveable electrical plug holding member that includes an electrical plug pair, the plug pair including a first conductive tine and a second conductive tine, the plug holding member also including a first connection in electrical communication with the first conductive tine of the electrical plug pair and a second connection in electrical communication with the second conductive tine of the electrical plug pair, the plug holding member having a first position, which places the electrical plug pair in a position for use with a first voltage standard and a second position, which places the electrical plug pair in position for use with a second voltage standard;
    b. a switch that is in a first state when the moveable electrical plug holding member is in the first position and that is in a second state when the moveable electrical plug holding member is in the second position; and c. a voltage modifier circuit, electrically coupled to the first connection and to the second connection, that is capable receiving an input voltage from the first connection and the second connection and that is capable of generating at least a first output voltage and a different second output voltage, the voltage modifier circuit responsive to the switch so that when the switch is in the first state, the voltage modifier circuit is capable of generating the first output voltage and so that when the switch is in the second state the voltage modifier circuit is capable of generating the second output voltage.

2. The switchable power supply of claim 1, in which the switch comprises:

a. a first contact disposed on moveable electrical plug holding member; and
   b. a second contact disposed away from the moveable electrical plug holding member and positioned so that when the moveable electrical plug holding member is in the first position, the first contact is electrically coupled to the second contact and so that when the moveable electrical plug holding member is in the second position, the first contact is not electrically coupled to the second contact.

3. The switchable power supply of claim 2, wherein the voltage modifier circuit comprises a diode bridge having a first node, a second node, a third node and a fourth node, wherein the first node is electrically coupled to the first connection and wherein the third node is electrically coupled to the second connection and wherein the third node is also electrically coupled to the first contact, the second node and the fourth node being electrically coupled to a direct current output, the voltage modifier circuit further comprising a fifth node that is electrically coupled to the second contact and that is electrically coupled to the second node through a first capacitor and that is electrically coupled to the fourth node through a second capacitor.

4. The switchable power supply of claim 2, wherein the voltage modifier circuit comprises a center-tapped transformer.

5. The switchable power supply of claim 1, wherein the moveable electrical plug holding member comprises a rotatable drum, having an axis of rotation, in which the electrical plug pair extends radially outward therefrom along a normal to the axis of rotation.

6. A switchable power supply, comprising:

a. a rotatable drum, having an axis of rotation, that includes an electrical plug pair including a first conductive tine and a second conductive tine, the rotatable drum also including a first connection in electrical communication with the first conductive tine and a second connection in electrical communication with the second conductive tine, the rotatable drum having a first position, which places the electrical plug pair in a position for use with a first voltage standard and a second position, which places the electrical plug pair in position for use with a second voltage standard, the electrical plug pair extending radially outward from the rotatable drum along a normal to the axis of rotation;
   b. a switch that is in a first state when the rotatable drum is in the first position and that is in a second state when the rotatable drum is in the second position, the switch comprising:
      i. a first contact disposed on the rotatable drum; and
      ii. a second contact disposed away from the rotatable drum and positioned so that when the rotatable drum is in the first position, the first contact is electrically coupled to the second contact and so that when the rotatable drum is in the second position, the first contact is not electrically coupled to the second contact; and
   c. a voltage modifier circuit, electrically coupled to the first connection and to the second connection, that is capable receiving an input voltage from the first connection and the second connection and that is capable of generating at least a first output voltage and a different second output voltage, the voltage modifier circuit responsive to the switch so that when the switch is in the first state, the voltage modifier circuit is capable of generating the first output voltage and so that when the switch is in the second state the voltage modifier circuit is capable of generating the second output voltage, wherein the voltage modifier circuit comprises a diode bridge having a first node, a second node, a third node and a fourth node, wherein the first node is electrically coupled to the first connection and wherein the third node is electrically coupled to the second connection and wherein the third node is also electrically coupled to the first contact, the second node and the fourth node being electrically coupled to a direct current output, the voltage modifier circuit further comprising a fifth node that is electrically coupled to the second contact and that is electrically coupled to the second node through a first capacitor and that is electrically coupled to the fourth node through a second capacitor.

* * * * *